July 9, 1929.  J. H. COOPER  1,719,875
POWER OPERATED STEERING GEAR
Filed June 30, 1924
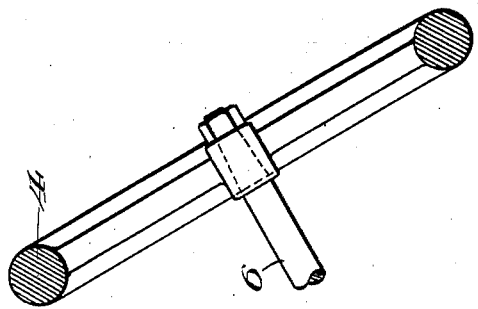
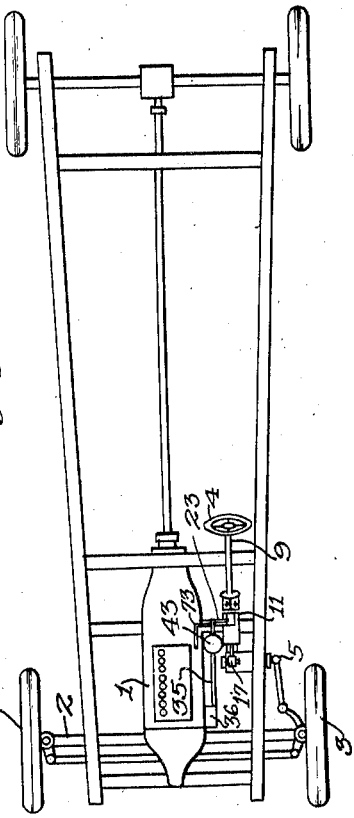
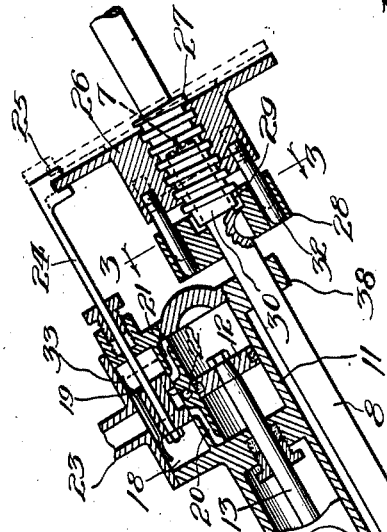
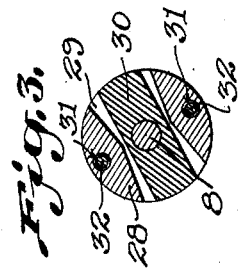
Inventor:
James H. Cooper,
by
Atty.

Patented July 9, 1929.

1,719,875

UNITED STATES PATENT OFFICE.

JAMES H. COOPER, OF DETROIT, MICHIGAN.

POWER-OPERATED STEERING GEAR.

Application filed June 30, 1924. Serial No. 723,126.

This invention relates to a power operated steering gear for automobiles and other motor vehicles.

One object of my invention is to provide a construction whereby the steering gear may be manually operated either in conjunction with or independently of the power device, so that upon failure of the latter for any reason hand steering may be entirely employed in case of accident to the power device.

Another object of my invention is to make my power device capable of use with steering gears of the type now designed, and thus furnish the necessary increased amount of power required for steering with balloon and like low pressure tires.

A further object of my invention is to automatically control the operation of the power device through the turning of the steering wheel in the regular way of manual steering and thus add no complication in handling by the use of the power device.

Other and further objects of my invention will appear from the following specification taken in connection with the accompanying drawings, in which—

Fig. 1 is a top plan view of the front part of an automobile chassis, showing the application of my power steering gear thereto;

Fig. 2 is a longitudinal sectional view through my power gear and associated parts of the regular steering gear equipment; and Fig. 3 is a transverse sectional view taken on line 3—3 of Fig. 2.

In Fig. 1, I have shown, in a more or less conventional manner, the chassis of an automobile, wherein 1 indicates the motor, 2 the front axle, 3, 3 the front wheels, and 4 the steering wheel or member, which by the usual gear including the rock shaft 5 is connected with the front wheels for steering them.

As shown in Fig. 2, the steering wheel 4 is carried at the upper end of a shaft 6, as usual in structures of this kind. The shaft 6 is provided at its lower end with a recess 7, into which extends the upper end of an aligned shaft 8. The shaft 8 is provided with a worm 9 in mesh with a worm wheel 10 on the shaft 5.

Associated with the shafts 6 and 8 is a power cylinder 11, in which reciprocates a piston 12. The rod 13 of the piston extends through one end of the cylinder and there is connected with a cross-head 14 sliding in a guide 15 extending from said end of the cylinder. A crank arm 16 on the shaft 5 is connected by a link 17 with the cross-head 14, so that the shaft 5 may be turned by the piston 12.

Said cylinder 11 is provided with a valve chamber 18, in which is a slide-valve 19 controlling the cylinder ports 20, 21, and 22, as shown in Fig. 2. The valve chest 18 has a fluid inlet 23.

The valve rod 24 extends out of the valve chest through one end thereof and is provided at its outer end with a yoke 25, which engages over the outer periphery of the flange on the nut 26. This nut travels on a coarse pitched screw 27 fixed to the shaft 6. Keyed or otherwise fixed to the shaft 8 is a collar 28 having in its upper face a slot 29. This slot, as shown in Fig. 3, extends diametrically across the collar and tapers from both ends inwardly toward the center. This makes the slot wider at its outer ends than at its center. Located in the slot 29 is a tongue-like projection 30 on the screw 27. The tongue 30 is narrower than the shortest width of the slot, so that the tongue may have a limited turning movement or lost motion in the slot 29 before contacting with its side walls. The collar 28 is also provided with two diametrically arranged holes 31, into which extend guide pins or studs 32 carried by the nut 26. These pins connect the nut and collar so that the nut will be held from turning while the tongue turns freely in the slot.

The device operates as follows: Through the lost motion provided by the slot 29, the screw 27 may be turned to a limited extent by the hand wheel 4 before turning the shaft 8. The nut 26 being held from rotation by the collar 28 during this initial turning of the screw 27 causes the nut 26 to travel along the screw open to the valve 19. When the screw is turned in one direction, say toward the left, the nut 26 is caused to travel up on the screw 27, as shown in dotted lines in Fig. 2, and the valve 19 is slid upward to uncover the passage 20 to allow the pressure fluid to enter the lower end of the cylinder 11 while the upper end of the cylinder is opened to the exhaust 22 through the passage 21. The driver continues to turn the steering wheel 4 to the left and, as soon as the lost motion is taken up, turns the worm 9 through the shaft 8. This releases any locking effect that the worm 9 would have on the worm wheel 10 to the turning of the latter by the shaft 5, and the pressure in the cylinder 11 through the movement of the piston 12 acts to turn the shaft 5 to operate the steering gear by power. The power device only turns the shaft 5 as far as the turning of the steering wheel 4 permits, it being necessary to keep the worm 9 apace with the wheel 10. On stopping the turning of the steering wheel 4, the action of the power device stops as the worm 9 locks the wheel 10 against further rotation by the shaft 5. On turning the steering wheel 4 to the right, the operation just described is reversed and the shaft 5 is turned by the power device in the direction of turning of the wheel 4 and to the extent it is turned. In the initial turning of the steering wheel 4 to the right, the nut 26 is caused to travel down the screw 27 and slide the valve 19 in the same direction to open the passage 20 to the exhaust 22 and the passage 21 to the inlet for the pressure fluid. As soon as the lost motion is taken up, the worm 9 is turned by the wheel 4 and the shaft 5 may be operated by the power device, as before. Turning the shaft 5 by the power device relieves the driver of the car of all steering strains and makes steering easy, as comparatively little effort is required on behalf of the driver to turn the steering wheel 4 to keep the worm 9 apace with the worm wheel 10 as the latter is turned by the power device. The driver turns the steering wheel 4 in the same manner as in manual steering, the actual work of turning the front wheels of the car through the steering gear being performed by the power device. With the latter set in operation and stopped through the manipulation of the steering wheel 4 in the same manner as in manual steering, the power device is under the full and complete control of the driver of the car at all times and no movements are required to start and stop the power device other than are required to turn and stop the steering wheel 4 as in the manner of manual steering.

Should the power supply fail for any reason, as by being cut off, or exert insufficient pressure, as when the wheels are in deep ruts, the steering apparatus may be worked manually and independently of the power mechanism or in conjunction therewith. This is brought about by having the tongue 30 in the wide slot 29. In steering by hand, the tongue 30 on contacting with the sides of the slot 29 couples the shafts 6 and 8 together and allows for manual steering in the usual way. As shown in Fig. 2, the valve 19 is held against the seat by a spring 33, or gravity in conjunction with the fluid pressure behind it may be used. The spring allows the valve to lift off its seat should the power build up in the cylinder for any reason, and thus allow for manually steering at that time. When using a tapered slot 29, as shown, the taper being outward from both sides of the center provides sufficient turning movement for the tongue for controlling the power device without interference by the shaft 8.

The working fluid may be oil. In such case, the main inlet 23 of the power cylinder is connected with an accumulator 34, which may be carried on the car at one side of the motor, as shown in Fig. 1. This accumulator is connected by a conduit 35 with a pump 36 driven from the motor when located as shown in Fig. 1. The accumulator 34 stores the working fluid under pressure and may be fitted with a device to by-pass or throttle the pump when the required pressure has been reached. The exhaust port 22 of the cylinder 11 is connected by a conduit 37 with the crank case when the oil for working the power steering gear is taken from that source. In using crank case oil as the motive fluid, the driver will be required to manually steer the car when the oil supply runs low. This condition will forcibly call the driver's attention to the fact that the oil in the crank case is low and needs attention.

In the drawings, I have shown the power steering device as closely adjacent the shaft 8. The cylinder 11 may have ears 38, 38 to engage the shaft. A collar 39 fixed on the shaft at one ear holds the cylinder from sliding up on the shaft. This conveniently locates the device and adapts it for attachment to a car already built. By the use of my power device greater power is had with less effort for steering and this is a decided advantage when steering a car equipped with balloon or like tires. These tires, by reason of their lower pressure, give increased tread surface on the roadway. With the manual steering gear now in use considerable effort is required when steering with these tires. With my steering apparatus the increase power required for steering a car equipped with these tires may be had without throwing any more work on the driver than required for the so-called high pressure tires while at the same time retaining the present steering gear equipment. Having my device capable of manual steering lends itself readily to automobile driving because manual steering is not entirely dispensed with.

My improved steering device may be equally as well used on trucks or heavy busses. The application of my power device may be made to the worm shaft 8, instead of to the worm wheel shaft 5 by placing the cylinder or cylinders at right-angles to the worm shaft and engaging the piston rod with the worm shaft by a rack and pinion.

While I have shown and described in detail a device of my invention and its application to a motor vehicle, it is of course to be understood that the details of construction and arrangement of parts may be variously changed and modified without departing from the spirit and scope of my invention.

I claim as my invention:

1. The combination with a motor vehicle steering gear having a steering member, of a power device connected with said steering gear for operating the same, two shafts, one connected with the steering gear and the other connected with said steering member, a screw on one shaft to turn therewith, a collar fixed on the other shaft and having a lost motion connection with said screw for coupling the shafts together, a nut on said screw and connected with the collar so that the nut will travel on the screw on turning the steering member shaft with respect to the other shaft, said nut being connected with said power device for controlling the operation thereof, said coupling permitting the shafts to be manually turned together by the steering member.

2. The combination with a motor vehicle steering gear having a steering member, of a power device connected with said steering gear for operating the same, two shafts, one connected with the steering gear and the other connected with said steering member, a screw on one shaft to turn therewith, a collar fixed on the other shaft and having a lost motion connection with said screw for coupling the shafts together, a nut on said screw, pins connecting the nut with said collar, said pins being carried by one part and having sliding connection with the other part, and means connecting the nut with the power device for controlling the operation thereof through the travel of the nut on said screw.

3. The combination with a motor vehicle steering gear having a steering member, of a power device connected with said steering gear for operating the same, two shafts, one connected with the steering gear and the other connected with said steering member, a screw on the steering member to turn therewith, a collar fixed on the other shaft and having a lost motion connection with said screw for coupling the shafts together, said lost motion connection consisting of a tongue and a slot on the respective parts, and means operated by the screw and connected with said power device for controlling the operation thereof on turning the steering member shaft with respect to the other shaft, said coupling permitting the shafts to be manually turned together by the steering member upon failure of the power device.

4. The combination with a motor vehicle steering gear having a steering wheel, of two aligned shafts connected with the steering gear and steering wheel, respectively, a screw fixed on one shaft, a collar fixed on the other shaft with a tongue and slot connection between the collar and screw, the slot widening from its center toward its ends so that the screw carrying shaft may have a limited rotative movement with respect to the other shaft, a power device connected with the steering gear for operating the same, and a traveling nut on said screw and connected with the collar and the power device, respectively, for controlling the operation of the power device in the turning of the steering wheel.

In testimony that I claim the foregoing as my invention, I affix my signature this 27th day of June, 1924.

JAMES H. COOPER.